Sept. 19, 1944.   A. A. SCARLETT   2,358,538
HITCH
Filed Sept. 21, 1942
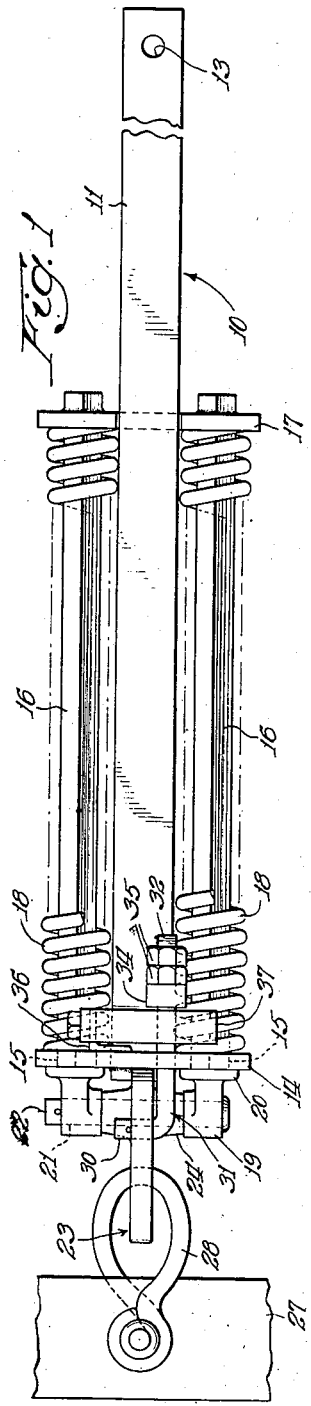
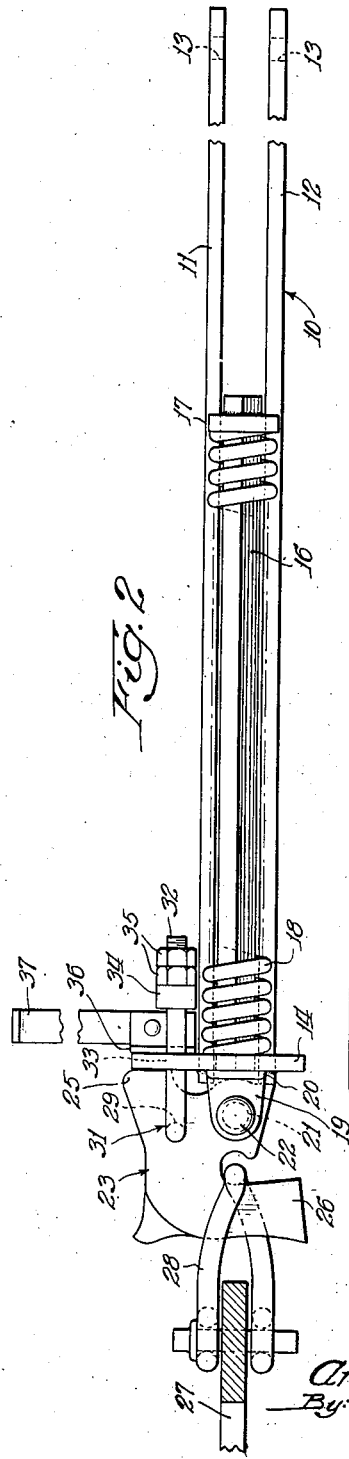
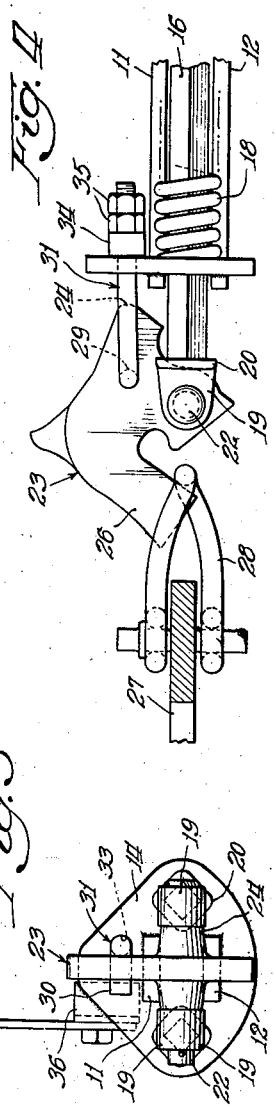
Inventor:
Arthur A. Scarlett
By Paul O. Pippel
Atty.

Patented Sept. 19, 1944

2,358,538

UNITED STATES PATENT OFFICE 2,358,538

HITCH

Arthur A. Scarlett, Hamilton, Ontario, Canada, assignor, by mesne assignments, to International Harvester Company, Chicago, Ill., a corporation of New Jersey Application September 21, 1942, Serial No. 459,094

9 Claims. (Cl. 280—33.16)

This invention relates to a hitch and more particularly to a hitch of the releasable type adapted to connect a trailing vehicle or implement to a source of draft power.

Releasable hitches of the general type to which this invention pertains have been heretofore employed, particularly in the agricultural field. Such hitches are desirable in the connecting of a plow, for example, to a tractor so that the hitch is automatically releasable to disconnect the plow from the tractor when an obstruction is encountered by the plow. The various forms of hitches heretofore known have been satisfactory in general but have been characterized by certain defects in the structure and function thereof, particularly as respects the reconnecting of the hitch after release. Many of the hitches require a resetting of the automatic release means and in most cases this is a comparatively annoying task.

The principal object of the present invention is to provide a new and improved releasable hitch generally of the type and for the purposes referred to above.

It is an important object to provide a hitch automatically releasable in response to a predetermined excess in draft forces and to provide the releasable means of simple form so that the hitch may be easily reconnected between a trailing vehicle or implement and a source of draft power.

Another important object is to provide a hitch having improved cushioning means whereby the hitch includes a resilient connection between the draft vehicle and trailing implement.

Another important object is to provide the hitch with a releasable hook that has an unobstructed connecting portion so that the hook may be moved to a release position and may be automatically reset to connecting position, thus eliminating the necessity of resetting complicated locking mechanism.

Other objects and desirable features of the invention will become apparent as the disclosure is more fully made in the following detailed description and accompanying sheet of drawing, in which:

Figure 1 is a plan view of a hitch embodying a preferred form of the invention;

Figure 2 is a side elevational view of the same structure;

Figure 3 is an end elevation of the hitch; and

Figure 4 is a view of the forward portion of the hitch shown as being released from a clevis or other connecting element on a source of draft power.

The preferred form of hitch illustrated comprises a first hitch part or draft member 10 including a pair of longitudinally extending parallel vertically spaced bars 11 and 12. The rear ends of the bars are apertured on a vertical axis as at 13 to provide for the connection or attachment of the hitch part 10 to a trailing vehicle or implement.

The forward ends of the bars 11 and 12 have rigidly secured thereto a transverse vertical plate 14. This plate is provided with a pair of transversely spaced apertures 15 arranged on axes paralleling the longitudinal bars 11 and 12. A pair of longitudinally extending rods 16 extend respectively through the apertures or holes 15 and respectively through a pair of transversely spaced apertures in a rearwardly disposed cross bar 17. This bar is transversely disposed with respect to the bars 11 and 12 and is slidably associated therewith. A coil spring 18 surrounds each rod 16, and its opposite ends abut the plate 14 and cross bar 17. These springs form part of the cushioning means for the hitch.

Each of the rods 16 extends forwardly of the plate 14 and carries thereon a head 19 including a shoulder 20 abutting the front surface of the plate 14. The head portions 19 are respectively provided with transversely alined openings or bores 21 in which is carried a transverse connecting pin 22. The normal positions of the parts just described are illustrated in Figures 1 and 2 wherein it is shown that the compression of the springs 18 is such as to maintain the shoulders 20 on the heads 19 of the rods 16 against the plate 14. The rear ends of the rods 16 are preferably rigidly secured as by welding to the transverse bar or plate 17.

The transverse connecting pin 22 carries a second hitch part or head 23 having a central bearing portion 24 free to move about the pin 22. The head includes an upper rearward portion 25 that normally abuts the upper front surface of the plate 14 and a forwardly disposed connecting portion in the form of a hook 26. The hook may be connected to a draft vehicle or other source of draft power, a representation of which is indicated in the drawing as including a draw bar 27 having a clevis 28 that is engaged by the hook 26 or the hitch head 23.

As best shown in Figure 2, the connecting point between the clevis 28 and the hook 26 of the hitch head 23 is longitudinally alined in the line of draft with the axis of the transverse pin 22.

The line along which the springs 18 compress is also coincident with the line of draft. Accordingly, as draft power is applied to the hitch for the drawing of the implement or trailing vehicle, relative longitudinal movement may occur between the first and second hitch parts 10 and 23. This relative movement is represented by forward movement of the hitch head 23 and rods 16 with respect to the hitch bars 11 and 12 and against the compression of the springs 18. It will thus be seen that the springs 18 serve to cushion shocks that may occur when the draft power is applied suddenly. It will also be noted that the disposition of the axis of the pivot pin 22 with respect to the line of draft and the hook 26 of the hitch head 23 is such that the hitch head does not pivot on the pin 22, in which case the hook does not release from the clevis 28. Still further, it is to be noted that the hook 26 is unobstructed at all times so that it may be moved vertically out of engagement with the clevis 28. The importance of this feature will be made clear presently.

The hitch head 23 is provided with an opening 29 disposed on a transverse axis parallel to and spaced above the transverse axis of the pivot pin 22. This opening carries the forward bent end 30 of a link 31 having a longitudinally rearwardly extending portion 32 passing through a longitudinally directed opening 33 in the plate 14 and carrying stop means in the form of a collar 34 and a pair of adjusting nuts 35.

As best shown in Figure 4, the link 31 and its associated parts provide release means for automatically effecting movement of the hitch head 23 to a position permitting release of the hook 26 from the clevis 28. As previously stated, the mere application of draft power to the hitch parts will not cause angular movement of the hitch head 23 about the pivot or connecting pin 22, because of the relationship between the pin and the point of engagement between the hook and clevis. However, after the hitch head and its associated parts have moved forwardly with respect to the hitch part 10, as in response to resistance encountered by the trailing vehicle or implement, the collar 34 of the stop means on the link 31 will engage the rear surface of the plate 14. In this manner continued forward movement of the upper portion of the hitch head 23 is arrested with the result that the head is tilted rearwardly about the pivot pin 22. The hook portion 26 of the head 23 thus moves upwardly with respect to the clevis 28 and these parts are subsequently released. The adjusting nuts 35 provide means by which the time of release of the hitch head 23 may be regulated.

The transverse plate 14 carries at its rear side a bracket 36 on which is mounted an upwardly extending handle 37. When the hitch is released from the draw bar, the parts are returned by the springs 18 to the positions indicated in Figures 1 and 2. Of course there is some downward movement of the hitch with respect to the clevis 28 so that in the reconnecting of the hitch and the clevis it becomes necessary to raise the hitch so that the hook 26 may again be dropped into position in the clevis. The handle 37 provides a convenient means by which the hitch may be lifted without necessitating the dismounting of the tractor- or other vehicle-operator.

The operation of the hitch should be apparent from the foregoing description of the construction thereof. It will be noted that the hitch combines cushion means and an automatic release feature, the latter being characterized by its simplicity. As stated above, the hitch head and its associated parts automatically return to normal position after release, and it is not necessary that the parts be reset, a heretofore complicated task. The means consisting of the link 31 and its related elements provide a simple form of adjusting means so that the amount of relative movement between the hitch parts can be regulated, thus enabling a selection of intervals before the hitch releases.

Other objects and features of the invention will undoubtedly suggest themselves to those skilled in the art. It will be understood of course that the foregoing description refers to only a preferred embodiment of the invention and that numerous modifications and alterations may be made therein without departure from the spirit and scope of the invention as defined in the appended claims.

What is claimed is:

1. A hitch comprising a first hitch part; a member mounted on the hitch part for yieldably resisted sliding movement with respect to said hitch part along the line of draft; a second hitch part including a release hook having a connecting portion; means pivoting the second hitch part on the sliding member on an axis transverse to the line of draft, the pivot axis and the connecting portion of the hook being so disposed with respect to each other that the second hitch part normally fails to pivot for release of the hook upon application of a predetermined draft force even though relative sliding movement occurs between the sliding member and the first hitch part; and limit means between the first and second hitch parts including means providing a pivot on an axis parallel to the aforesaid axis and at a portion of the second hitch part spaced from said first axis, whereby continued application of draft force pivots said second hitch part about the second pivot axis for release of the hook.

2. A hitch comprising a first hitch part; a second hitch part including a release hook; a rod slidably mounted on the first hitch part; spring means between the rod and first hitch part normally resisting relative sliding between the rod and first hitch part; means rotatably mounting the second hitch part on the rod on an axis transverse to and intersecting the line of draft through said hitch parts, so that the second hitch part is normally non-rotatable on the rod upon sliding of the rod with respect to the first hitch part; and a second rod loosely connected between the first hitch part and the second hitch part for permitting a limited amount of sliding movement of said first rod and second hitch part with respect to the first hitch part, said second rod including a portion engaging the second hitch part at a portion thereof spaced from the aforesaid pivot axis to initiate rotation of said second hitch part.

3. A hitch comprising a first hitch part; a second hitch part including a release hook; a member movably connected to the first hitch part; spring means between the member and first hitch part normally resisting relative movement between the member and first hitch part; means rotatably mounting the second hitch part on the member on an axis transverse to and intersecting the line of draft through said hitch parts, so that the second hitch part is normally non-rotatable on the member upon movement of the member with respect to the first hitch part; and a link loosely connected between the first hitch part and the second hitch part for permitting a limited amount of movement of said member and second hitch part as a unit with respect to the first hitch part, said link including a portion engaging the second hitch part at a portion thereof spaced from the aforesaid pivot axis to initiate rotation of said second hitch part.

4. A hitch comprising a first hitch part; a member mounted on the hitch part for yieldably resisted movement with respect to said hitch part; a second hitch part including a release hook having a connecting portion; means pivoting the second hitch part on the member on an axis transverse to the line of draft, the pivot axis and the connecting portion of the hook being so disposed with respect to each other that the second hitch part normally fails to pivot for release of the hook upon application of a predetermined draft force even though relative movement occurs between the member and the first hitch part; and adjustable limit means between the first and second hitch parts including means providing a pivot on an axis parallel to the aforesaid axis and at a portion of the second hitch part spaced from said first axis, whereby continued application of draft force pivots said second hitch part about the second pivot axis for release of the hook.

5. A release hitch for connection between a trailing vehicle or implement and a draft vehicle having a connecting element: said hitch comprising a first hitch part, including means for connection to the trailing vehicle or implement; a second hitch part comprising a hook adapted for connection to the connecting element of the draft vehicle; means mounting the second hitch part on the first hitch part for yieldably resisted separation from said first hitch part generally along the line of draft, and including a pivot for the hook on an axis transverse to the line of draft and spaced along the line of draft from the point of connection between the hook and the connecting element of the draft vehicle so that said axis and said point of connection are alined on the line of draft; and means for effecting pivoting of the hook on said axis after a predetermined separation of the first and second hitch parts.

6. A release hitch, comprising a hitch bar adapted for disposition along the line of draft between a draft source and a trailing vehicle or implement; a plate secured at one end of said bar transversely thereof, said plate including a pair of apertures paralleling the line of draft and spaced apart transversely of the line of draft; a rod slidable through one aperture with respect to the bar; spring means between the rod and bar to yieldably resist said sliding; means providing a pivot on the rod on an axis transverse to the line of draft and adjacent the plate; a hook mounted on said pivot and including a portion normally maintained against rotation by engagement with the plate; a link pivoted at one end to the hook on an axis paralleling the aforesaid pivot axis and spaced therefrom transversely of the line of draft, the other end of said link passing slidably through the other aperture in the plate; and an adjustable stop on the link engageable with the plate after predetermined sliding of the hook and rod together with respect to the hitch bar and plate.

7. A release hitch comprising a pair of hitch parts adapted respectively to be connected to a draft vehicle and to a trailing vehicle, one hitch part including an open portion providing an unobstructed connecting hook; means mounting said hook on the other hitch part for cushioned movement along the line of draft with respect to said other hitch part, said means including a support mounting said hook also for movement from a connecting position to a release position; means retaining said hook in connecting position during limited cushioned movement of the hook with respect to the other hitch part; and means for effecting movement of the hook on the aforesaid support to release position, said open portion of the hook remaining unobstructed for reconnection to its vehicle.

8. A hitch comprising a first hitch part; a second hitch part including a release hook; a pair of rods slidably mounted on the first hitch part; spring means between the pair of rods and the first hitch part normally resisting relative sliding between the pair of rods and the first hitch part; means rotatably mounting the second hitch part on the rods on an axis transverse to and intersecting the line of draft through said hitch parts, so that the second hitch part is normally non-rotatable on the rods upon sliding of the rods with respect to the first hitch part; and a third rod loosely connected between the first hitch part and the second hitch part for permitting a limited amount of sliding movement of said pair of rods and second hitch part with respect to the first hitch part, said third rod including a portion engaging the second hitch part at a portion thereof spaced from the aforesaid pivot axis to initiate rotation of said second hitch part.

9. A release hitch comprising a hitch bar adapted for disposition along the line of draft between a draft source and a trailing vehicle or implement; a plate secured at one end of said bar transversely thereof, said plate including a pair of apertures paralleling the line of draft and spaced apart transversely of the line of draft, said plate including a third aperture paralleling the first apertures and spaced vertically therefrom; a pair of rods slidable respectively through the pair of apertures with respect to the bar; spring means between the pair of rods and bar to yieldably resist said sliding; means providing a pivot on the pair of rods on an axis transverse to the line of draft and adjacent the plate; a hook mounted on said pivot and including a portion normally maintained against rotation by engagement with the plate; a link pivoted at one end to the hook on an axis paralleling the aforesaid pivot axis and spaced vertically therefrom, the other end of said link passing slidably through the third aperture in the plate; and an adjustable stop on the link engageable with the plate after predetermined sliding of the hook and pair of rods together with respect to the hitch bar and plate.

ARTHUR A. SCARLETT.